United States Patent
Acre

[11] 4,007,815
[45] Feb. 15, 1977

[54] RELEASABLE LOCK FOR BRAKES
[75] Inventor: Leon R. Acre, Ovid, Mich.
[73] Assignee: Midland-Ross Corporation, Cleveland, Ohio
[22] Filed: Dec. 12, 1975
[21] Appl. No.: 640,175
[52] U.S. Cl. .............................. 188/265; 92/25; 188/67; 303/89
[51] Int. Cl.² ...................................... B60T 17/16
[58] Field of Search ............ 188/67, 69, 82.3, 82.7, 188/170, 265; 303/89; 92/24, 25, 27, 28

[56] References Cited
UNITED STATES PATENTS

| 1,586,269 | 5/1926 | Smith | 188/67 |
| 2,505,612 | 4/1950 | Ericson | 188/67 |
| 2,759,569 | 8/1956 | Keehn | 188/265 |
| 3,402,792 | 9/1968 | Masser | 188/265 |
| 3,597,016 | 8/1971 | Gachot et al. | 188/265 |
| 3,759,147 | 9/1973 | Johnsson et al. | 92/25 |
| 3,874,747 | 4/1975 | Case et al. | 188/265 |

Primary Examiner—Trygve M. Blix
Assistant Examiner—Edward R. Kazenske
Attorney, Agent, or Firm—H. Duane Switzer

[57] ABSTRACT

A locking device for a reciprocating rod brake actuator movable between brake applying and brake releasing positions includes a pivoted pawl movable between locking and releasing positions for releasably locking the rod in its brake applying position. A spring normally biases the pawl to its locking position, and a fluid cylinder is operative when pressurized for moving the locking device to its releasing position. The rod is movable toward and away from the pawl, and is normally supported against movement away from the pawl by a releasable support. Release of the support frees the rod for free movement between its brake applying and releasing positions even though the pawl is in its locking position.

4 Claims, 3 Drawing Figures

RELEASABLE LOCK FOR BRAKES

BACKGROUND OF THE INVENTION

This application relates to the art of locking devices and, more particularly, to locking devices for selectively locking a movable member against movement in at least one direction. The invention is particularly applicable for use in fluid operated braking systems for vehicles and will be particularly described with reference thereto. However, it will be appreciated that the improved locking device of the present invention has broader aspects and may be used for selectively locking movable members against movement in mechanisms other than vehicle brakes.

Pneumatically operated vehicle brakes have air motors to which pressurized air is supplied for applying the vehicle brakes. Systems of this type also include a parking brake arrangement wherein pressurized air is directly connected to the air motors from a reservoir for applying the brakes. In parking brake arrangements of this type, a slow leak or other failure in the pressurized air source may cause release of the brakes, and this presents a very hazardous condition.

It is known to have mechanical locking devices for locking the parking brakes against release in the event of a failure in the pressurized air source. In one arrangement of this type, the reciprocating rod brake actuator must be replaced with a special toothed rod. In another arrangement, the conventional clevis connecting the rod to the brake adjuster must be replaced with a special straight travel clevis. Arrangements of this type are relatively expensive and require substantial installation time.

It would be desirable to have a locking device of the type described which would not require replacement of existing brake parts with special new parts.

SUMMARY OF THE INVENTION

A fluid operating brake having a reciprocating rod brake actuator movable between brake applying and brake releasing positions includes selectively operable releasable locking means for releasably locking the operating member in its brake applying position. The locking means is movable between and releasing positions, and yieldable biasing means normally biases the locking means to its locking position. Fluid pressure means is operative when pressurized for moving the locking means to its releasing position against the force of the biasing means. Pressure relief means is provided for relieving pressure in the fluid pressure means so that the locking means automatically moves to its locking position.

The improved locking means of the present application is used in a pneumatic vehicle braking system of the type including air motors for applying vehicle brakes. A parking brake valve relieves pressure in the emergency line for opening an emergency relay valve so that pressurized air is supplied from a reservoir to the air motor for applying the brakes. The locking device of the present invention is simultaneously relieved of pressure so that it moves to its locking position.

In a preferred arrangement, the locking means of the present invention is arranged so that in its locking position free movement is provided of the brake operating member from its brake releasing position to its brake applying position.

In accordance with one aspect of the invention, selectively operable releasing means is provided separate from the fluid pressure means for releasing the operating member for movement from its brake applying position to its brake releasing position even when the locking means is in its locking position. In the event of a failure in the air pressure system once the vehicle has been parked, the releasing means allows the vehicle to be towed for service.

In the preferred arrangement, the releasable locking means includes a shaft connected with a pivoted pawl and with a piston in a cylinder which defines the fluid pressure means. The yieldable biasing means comprises a spring in the cylinder biasing against the piston for moving same in a direction for acting through the shaft to pivot the pawl into engagement with the operating member. A fluid pressure conduit communicates with the cylinder on the opposite side of the piston from the spring for moving the pawl out of engagement with the operating member.

The pivoted pawl may be considered an engaging means which is movable between engaging and disengaging positions. The releasing means for releasing the operating member for movement, even though the locking means is applied, may be in the form of a rotatable cam positioned on the opposite side of the operating member from the locking means. The rotatable cam supports the operating member against movement away from the locking means in the normal position of the cam. The cam is rotatable to another position for freeing the operating member for movement away from the pawl or locking means so that the operating member can move from its brake applying position to its brake releasing position even though the locking means is in its locking position.

It is a principal object of the present invention to provide an improved releasable locking means for movable operating members.

It is another object of the invention to provide an improved releasable locking means for locking vehicle brakes in their applied position.

It is also an object of the present invention to provide an improved locking device which is very reliable in operation, and relatively inexpensive to manufacture and assemble.

It is an additional object of the present invention to provide an improved mechanical lock for locking vehicle brakes in an applied position, while permitting disengagement of the vehicle brakes for towing of the vehicle even though the locking device is in its locking position.

DESCRIPTION OF A PREFERRED EMBODIMENT

Figure 1:
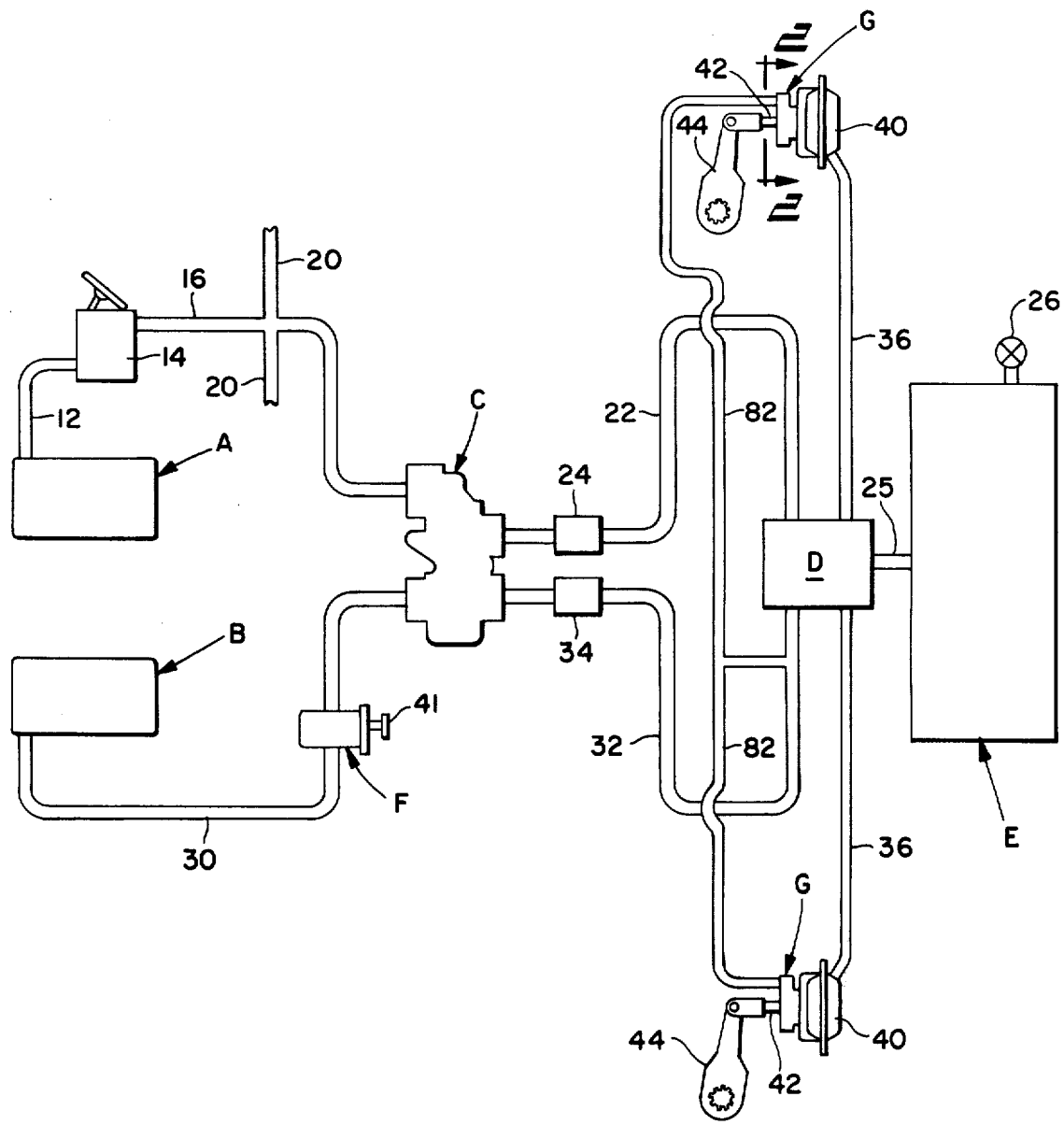
FIG. 1 is a schematic illustration of a vehicle braking system having the improved locking means of the present invention incorporated therein.

With reference to the drawing, FIG. 1 schematically shows a pneumatic braking system for a tractor-trailer. However, it will be recognized that the improved locking device of the present application can be used on braking systems for buses and other types of vehicles.

Service and emergency air reservoirs A and B are pressurized by an air compressor in a known manner. Service air reservoir A communicates through a line 12 with a tractor treadle valve 14, and a line 16 from the treadle valve communicates with lines 20 leading to the air motors for the tractor wheel brakes and with a tractor protection valve C. A trailer service line 22 is connected by a coupling 24 for communication with tractor service line 16 through valve C. Trailer service line 22 communicates with an emergency relay valve D connected by conduit 25 with a trailer air reservoir E having a bleed valve 26.

Emergency air reservoir B communicates through line 30 and dash valve F with tractor protection valve C. Trailer emergency line 32 is connected by a coupling 34 for communication through valve C with line 30. Trailer emergency line 32 is also connected with emergency relay valve D. Lines 36 extend from emergency relay valve D to air motors 40 having rods 42 connected with levers 44 for applying the trailer brakes. Locking devices G are associated with each operating rod 42 of each air motor 40.

Valves C, D and F may be of any suitable well-known type and form no part of the present invention. By way of example, tractor protection valve C may include, but is not limited to, the type shown in U.S. Pat. No. 2,570,874 issued Oct. 9, 1951, to Shumaker. Emergency relay valve D may include, but is not limited to, the type shown in U.S. Pat. No. 2,656,014 issued Oct. 20, 1953, to Fites. Dash valve F may include, but is not limited to, the type shown in U.S. Pat. No. 3,096,789 July 9, 1963, to Horowitz et al.

Springs in air motors 40 normally bias rods 42 to the right in FIG. 1 to brake releasing positions. When reservoirs A and B are pressurized, opening of treadle valve 14 will supply pressurized air through lines 20 to the tractor brakes. Pressurized air will also be supplied through tractor protection valve C to trailer service line 22, and this pressure is communicated through emergency relay valve D to lines 36 for operating air motors 40 to extend rods 42 for applying the trailer brakes. When treadle valve 14 is again closed, the pressure in conduits 16, 20, 22 and 36 bleeds to atmosphere for releasing the brakes.

When emergency air reservoir B is charged, dash valve F is opened by pushing its plunger 41 for supplying air through tractor protection valve C to trailer emergency line 32, emergency relay valve D and line 25 for pressurizing trailer reservoir E. A failure in trailer service line 22 will cause tractor protection valve C to operate so that air in trailer service line 22 will not bleed off when treadle valve 14 is opened.

The system is designed so that loss of air pressure in conduits 30 and 32 causes emergency relay valve D to shuttle for establishing communication between trailer reservoir E and lines 36 for applying the trailer brakes. When the trailer is parked, plunger 41 of dash valve F is normally pulled for bleeding the air pressure in conduits 30 and 32 to atmosphere so that emergency relay valve D shuttles to establish communication between trailer reservoir E and lines 36 for applying the trailer brakes. The parking brakes will then remain applied unless there is a leak somewhere in the system such as in lines 36 or trailer reservoir E. Likewise, starting of the vehicle to again pressurize emergency air reservior B and pushing of plunger 41 on dash valve F would shuttle emergency relay valve D for relieving the air pressure in lines 36 and releasing the trailer brakes.

Locking devices G in accordance with the present invention provide a mechanical lock for locking the trailer brakes in their applied position once the emergency or parking brake has been applied. Such an arrangement will maintain the parking brake in its applied position even though all of the air may leak from trailer air reservoir E and lines 36.

Figure 2:
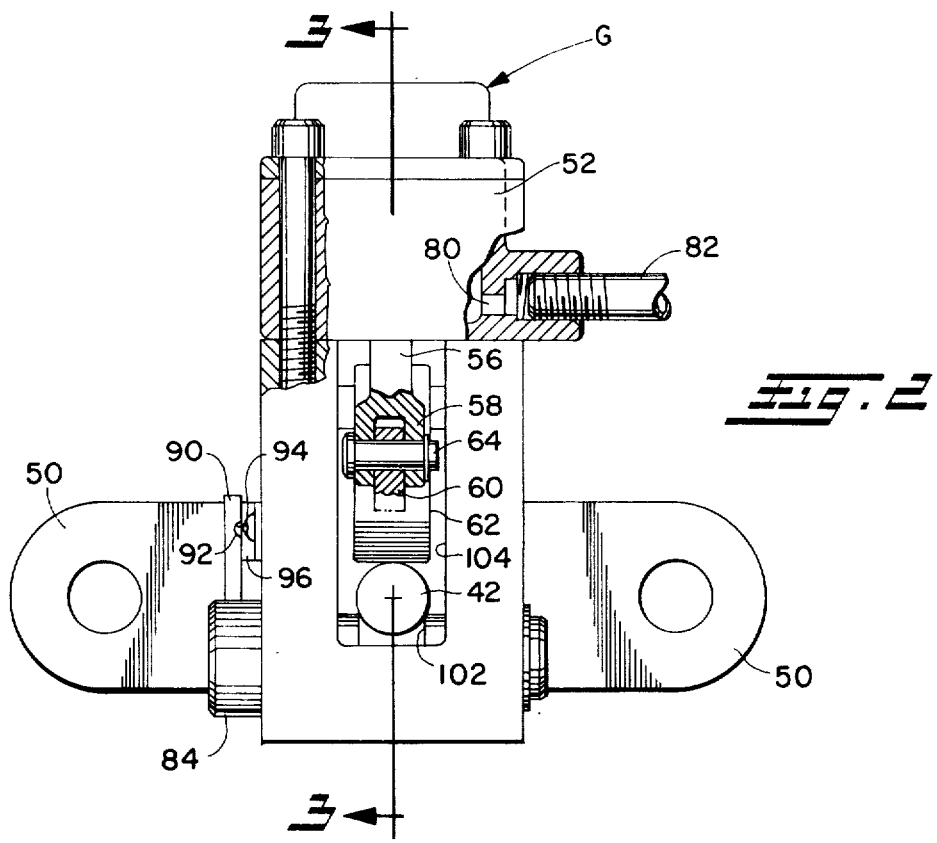
FIG. 2 is an elevational view taken generally on line 2—2 of FIG. 1, and with portions cut-away for clarity of illustration.
Figure 3:
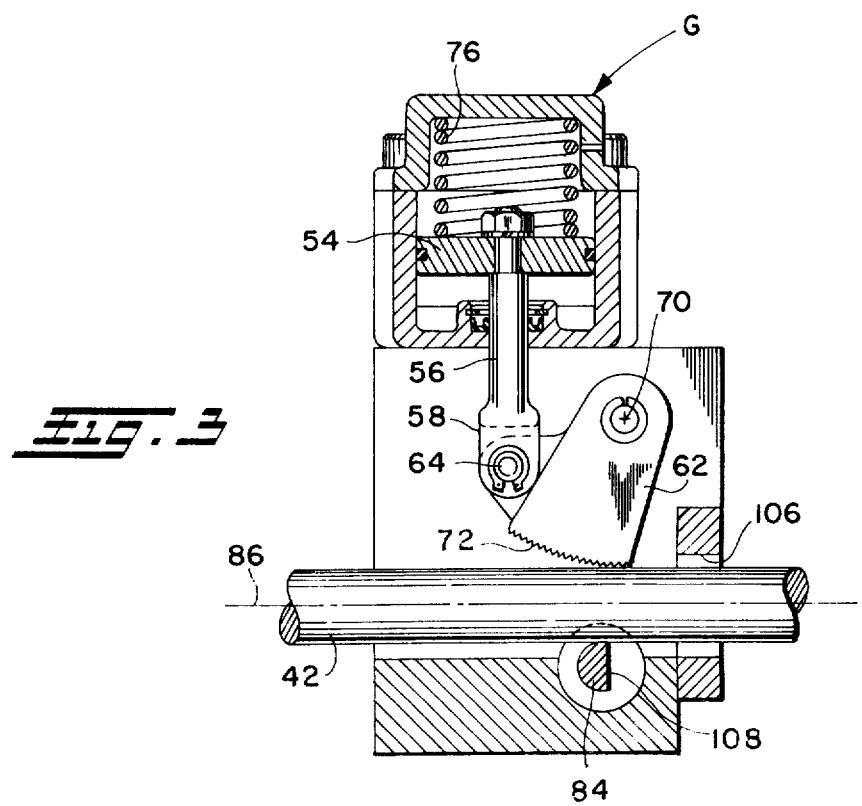
FIG. 3 is a cross-sectional elevational view taken generally on line 3—3 of FIG. 2.

As shown in FIGS. 2 and 3, locking means G includes a housing having mounting flanges 50 for mounting the housing to a bracket or a support with air motors 40 of FIG. 1. A fluid cylinder 52 receives a piston 54 connected with a shaft 56 having a clevis end 58 pivotally connected to an ear 60 on a pawl 62 by a pin 64. Ear 60 has an elongated slot receiving pin 64 to accommodate the arcuate movement of pin 64 while shaft 56 moves linearly. Pawl 62 is pivotally mounted on a pawl pivot axis 70 and has an arcuate pawl surface 72 facing toward operating member 42. Surface 72 is grooved or striated, or otherwise roughened, so it firmly grips even a smooth rod to lock same against movement. Yieldable biasing means in the form of a coil spring 76 is positioned in cylinder 52 above piston 54 for normally biasing piston 54 downwardly in FIG. 3. A fluid inlet port 80 communicates with cylinder 52 below piston 54 on the opposite side thereof from spring 76. Fluid inlet port 80 is connected by conduit 82 with trailer emergency line 32 as shown in FIG. 1.

Releasing means in the form of a releasable support means is provided for releasing the trailer brakes so the vehicle can be towed even though the locking means is in its engaged position. The releasing means may be in the form of a rotatable cam shaft 84 mounted on an axis extending perpendicular to axis 86 of operating member 42. A lever 90 has a recess 92 for cooperating with a detent 94 on a bracket 96 secured to the housing of locking means G for holding cam 84 against rotation. Obviously, lever 90 may be releasably locked in position in any suitable manner as by bolt extending through a hold therein and into a tapped bore in the housing of locking means G. Cam 84 has an arcuate central portion 102 in which operating member 42 is slidably supported as it extends through a large opening 104 and enlarged hole 106 in the housing of locking means G. Cam 84 has a flat surface 108 as shown in FIG. 3 so that cam member 84 may be rotated counter-clockwise 90° in FIG. 3 for aligning flat surface 108 with operating member 42 so that operating member 42 can move away from pawl 62.

When the system is operating normally, pressurized air supplied through line 82 to cylinder 52 moves piston 54 upwardly in FIG. 3 against the force of the yieldable biasing means defined by spring 76. This movement is transmitted through shaft 56 to pawl 62 for pivoting same clockwise about pawl pivot axis 70 out of engagement with the brake operating member defined by push rod 42. Push rod 42 is then free to reciprocate to the left and right in FIG. 3 for applying and releasing the brakes as treadle valve 14 is operated in service applications. When it is desired to park the trailer, air pressure in line 32 of FIG. 1 is relieved by pulling plunger 41 of dash valve F for exhausting the pressure to atmosphere. This causes emergency relay valve D to shuttle so that pressurized air is supplied from trailer reservoir E through lines 36 to air motors 40 for extending push rods 42 and applying the brakes. Simultaneously with exhaustion of pressure in line 32, the pressure in line 82 is also exhausted so that piston 54 of FIG. 3 moves downwardly under the biasing force of spring 76. This movement is transmitted through shaft 56 to pawl 62 for pivoting same counterclockwise about pivot axis 70 for engaging pawl surface 72 with push rod 42. Arcuate pawl surface 72 engages push rod 42 to the left of pawl pivot axis 70 in FIG. 3 so that push rod 42 is free to move to the left in FIG. 3 toward its brake applying position even though pawl surface 72 is engaging same. However, push rod 42 cannot move to the right in FIG. 3 because the tendency to move pawl 62 further counterclockwise about pawl pivot axis 70 simply engages pawl arcuate surface 72 more firmly with push rod 42. If no failures have occurred in the system, repressurization of emergency air reservoir B and operation of dash valve F will again operate emergency relay valve D for bleeding the air from air motors 40. Simultaneously, air pressure acting through conduit 82 enters cylinder 52 for again moving piston 54 upwardly to disengage pawl 62 from push rod 42 so that it can be retracted for releasing the brakes.

In the event a failure has occurred in the system once the emergency brakes have been applied so that line 32 cannot be pressurized for supplying pressurized air to cylinder 52 for releasing the locking means, it is still possible to release the brakes for towing of the vehicle. If there is still air in trailer air reservoir E, it may be bled off through relief valve 26. The springs in air motors 40 will then be biasing push rods 42 to their retracted brake releasing position. In order to allow such movement of a push rod 42 even though pawl 62 is in its locking position for preventing such movement, the releasing means defined by cam shaft 84 is simply rotated counterclockwise 90° as viewed in FIG. 3 for aligning flat surface 108 thereof with rod 42. This will allow movement of rod 42 away from pawl 62 a sufficient distance for allowing retraction of rod 42 and release of the brakes.

In the arrangement shown and described, push rod 42 may be considered an operating member which is movable in first and second opposite directions between brake applying and brake releasing positions. Locking means G is a selectively operable releasable locking means for releasably locking operating member 42 in its brake applying position. Locking means G is movable between a locking position and a releasing position, and is arranged so that even when in its locking position movement of operating member 42 is allowed from its brake released position toward its brake applied position. Pawl 62 may be considered an engaging means which is movable between an engaging position in which it engages operating member 42, and a disengaging position wherein it is disengaged from operating member 42. The engaging means or locking means defined by pawl 62 is normally biased to its engaged or locking position by yieldable biasing means defined by spring 76. Cylinder 52 defines fluid power means for moving the locking means or engaging means defined by pawl 62 to its releasing or disengaged position when the fluid power means is pressurized by air pressure acting through inlet 80. The releasing means defined by rotatable cam 84 is positioned on the opposite side of operating member 42 from engaging means 62 and normally supports operating member 42 against movement away from engaging means 62. When the releasing means defined by cam 84 is operated by rotating same 90°, sufficient movement of operating member 42 is allowed away from engaging means 62 so that operating member 42 can be moved to its brake releasing position even though the locking means is in its locking position.

It will be obvious that many different arrangements are possible for operating locking means G. For example, conduit 82 could be directly connected to a reservoir A, B or E through a one-way check valve. A bleed valve in conduit 82 between cylinder 52 and the check valve could be provided for relieving the pressure in cylinder 52 for moving the locking means to its locking position. Operation of service or emergency brake systems would then lock the brakes in their applied positions.

Although the invention has been shown and described with respect to a preferred embodiment, it is obvious that equivalent alterations and modifications will occur to other skilled in the art upon the reading and understanding of this specification. The present invention includes all such equivalent alterations and modifications, and is limited only by the scope of the claims.

I claim:

1. A locking device for a reciprocating rod brake actuator movable between brake applying and brake releasing positions, said locking device including a pivoted pawl having a pawl surface engageable with said rod by moving in an arcuate path toward and away from said rod between rod locking and releasing positions, said pawl in said locking position thereof being in engagement with said rod for releasably locking same against movement in a direction from said brake applying position toward said brake releasing position while providing free movement thereof in a direction from said brake releasing position to said brake applying position, yieldable biasing means for normally biasing said pawl to said locking position, fluid pressure means operative when pressurized for moving said pawl to said releasing position against the force of said biasing means, pressure relief means for selectively relieving pressure in said fluid pressure means, and selectively operable releasing means separate from said fluid pressure means and located generally on the opposite side of said rod from said pawl for releasing said rod for movement from said brake applying position to said brake releasing position when said pawl is in said locking position by moving said rod away from and out of engagement with said pawl.

2. The device of claim 1 wherein said locking device includes a linearly movable shaft connected with said pawl and with a piston in a cylinder defining said fluid pressure means, said biasing means comprising a spring in said cylinder biasing against said piston for moving same in a direction for acting through said shaft to pivot said pawl to said locking position, and a fluid pressure conduit communicating with said cylinder on the opposite side of said piston from said spring.

3. The device of claim 2 wherein said releasing means includes a rotatable cam releasably locked in a first position supporting said rod against movement away from said pawl, and said cam being rotatable to a second position for providing movement of said rod away from said pawl.

4. A locking device for a reciprocating rod brake actuator extending through a housing and being movable between brake applying and brake releasing positions, said locking device including locking means movable to a locking position for locking said rod in said brake applying position, yieldable biasing means for normally biasing said locking means to said locking position, fluid pressure means operative when pressurized to move said locking means out of said locking position, said rod being movable toward and away from said locking means, a cam shaft rotatably mounted on said housing on a cam axis extending perpendicular to the longitudinal axis of said rod, said cam shaft being on the opposite side of said rod from said locking means, said cam shaft having a central portion receiving said rod and including an arcuate portion and a flat portion, said flat portion being located substantially closer to said cam axis than said arcuate portion, said cam shaft being rotatable between a position wherein said arcuate portion faces said rod for supporting same against movement away from said locking means and a position wherein said flat portion faces said rod for providing movement of said rod away from said locking means to free said rod for free movement between said brake applying and releasing positions when said locking means is in said locking position.

* * * * *